(12) United States Patent
Williams et al.

(10) Patent No.: US 10,817,865 B2
(45) Date of Patent: *Oct. 27, 2020

(54) METHOD AND APPARATUS FOR PERFORMING A TRANSACTION

(71) Applicant: American International Group, Inc., New York, NY (US)

(72) Inventors: Frank Williams, New York, NY (US); Riddhish S. Trivedi, Windsor, NJ (US); Shekhar P. Bagawde, Jersey City, NJ (US); Varun Shetty, Jersey City, NJ (US)

(73) Assignee: American International Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,286

(22) Filed: Aug. 18, 2015

(65) Prior Publication Data

US 2015/0356544 A1 Dec. 10, 2015

Related U.S. Application Data

(63) Continuation of application No. 12/483,875, filed on Jun. 12, 2009, now Pat. No. 9,141,954.

(Continued)

(51) Int. Cl.
*G06F 3/048* (2013.01)
*G06Q 20/22* (2012.01)
(Continued)

(52) U.S. Cl.
CPC .............. *G06Q 20/22* (2013.01); *G06Q 20/00* (2013.01); *G06Q 20/356* (2013.01); *G06Q 20/40* (2013.01);
(Continued)

(58) Field of Classification Search
CPC ...................................................... G06F 3/048
See application file for complete search history.

(56) References Cited

U.S. PATENT DOCUMENTS 6,615,238 B1    9/2003 Melet et al.
7,080,020 B1    7/2006 Klaus
(Continued)

OTHER PUBLICATIONS

International Searching Authority, International Search Report and Written Opinion relative to cognate International Patent Application No. PCT/US2009/047236 (Jul. 28, 2009).

(Continued)

*Primary Examiner* — Pei Yong Weng
(74) *Attorney, Agent, or Firm* — Leydig, Voit & Mayer, Ltd.

(57) ABSTRACT

A system and method for performing a transaction can allow a user to perform a multi-step process on a single web page. The system can receive an initiate-application command from a user at an application server and, in response, initiate an application for facilitating a transaction. The system can present a parameter-request panel, including a set of parameter-request fields, to the user at a client. The system can receive transaction parameters from the user via the set of parameter-request fields. In response to receiving the transaction parameters, the system can present a transaction-options panel, including a set of transaction options associated with the transaction parameters, to the user without obscuring the parameter-request panel. The system can receive from the user a transaction-option selection associated with the set of transaction options and, in response, present a transaction-completion panel to the user without obscuring the parameter-request panel or the transaction-options panel. The transaction-completion panel can include a set of transaction-completion fields associated with the transaction-option selection. The system can receive from the user transaction-completion information via the transaction-completion fields and, in response, complete the transaction.

10 Claims, 15 Drawing Sheets

Related U.S. Application Data

(60) Provisional application No. 61/061,209, filed on Jun. 13, 2008.

(51) Int. Cl.
*H04L 29/08* (2006.01)
*G06Q 20/00* (2012.01)
*G06Q 20/34* (2012.01)
*G06Q 30/06* (2012.01)
*G06Q 20/40* (2012.01)

(52) U.S. Cl.
CPC ............ *G06Q 30/06* (2013.01); *H04L 67/10* (2013.01); *H04L 67/32* (2013.01)

(56) References Cited

U.S. PATENT DOCUMENTS

| | | | |
|---|---|---|---|
| 7,092,892 | B1* | 8/2006 | Sobalvarro ............ G06Q 10/02 705/27.1 |
| 2001/0021917 | A1 | 9/2001 | Hatano |
| 2002/0069122 | A1* | 6/2002 | Yun ........................ G06Q 30/06 705/26.1 |
| 2003/0018497 | A1* | 1/2003 | Luedtke ................. G06Q 40/02 705/4 |
| 2003/0065519 | A1 | 4/2003 | Gibson et al. |
| 2003/0083908 | A1 | 5/2003 | Steinmann |
| 2004/0015416 | A1 | 1/2004 | Foster et al. |
| 2004/0103012 | A1 | 5/2004 | Nussbaum et al. |
| 2005/0114253 | A1 | 5/2005 | Low |
| 2005/0192881 | A1 | 9/2005 | Scannell |
| 2006/0287966 | A1 | 12/2006 | Srinivasaraghavan et al. |
| 2007/0005401 | A1 | 1/2007 | Vinyard |
| 2007/0157021 | A1 | 7/2007 | Whitfield |
| 2008/0052101 | A1 | 2/2008 | Ziade et al. |
| 2008/0052135 | A1 | 2/2008 | Ziade et al. |
| 2008/0052136 | A1 | 2/2008 | Ziade et al. |
| 2008/0052137 | A1 | 2/2008 | Ziade et al. |
| 2008/0065426 | A1 | 3/2008 | Ziade et al. |
| 2008/0109322 | A1 | 5/2008 | Leach et al. |
| 2008/0120144 | A1 | 5/2008 | Bartell et al. |
| 2009/0164315 | A1 | 6/2009 | Rothman |

OTHER PUBLICATIONS

International Bureau of WIPO, International Preliminary Report on Patentability relative to cognate International Patent Application No. PCT/US2009/047236 (Dec. 23, 2010).

\* cited by examiner

FIG. 2 travel insurance quote trip details

| Annual Multi-Trip |
| Europe |
| ○ Find your Travel Region |
| 08/09/2008 — 412 |
| Adult(s) 19-65 yrs: 2 |
| Senior(s) 66-75 yrs: 0 |
| Student(s) 19-22 yrs: 0 |
| Children(s) 02-18 yrs: 0 |
| Infant(s) under 2 yrs: 1 |
| Family — 414 | cover options

| | Standard Annual £57.00 [Select] — 434 | | Premier World Wide £75.00 [Select] — 434 | | Premier Plus World Wide £97.00 [Select] — 434 | | Premier Plus Super £132.00 [Select] — 434 | |
|---|---|---|---|---|---|---|---|---|
| *Mouseover text to view details | Value | Excess | Value | Excess | Value | Excess | Value | Excess |
| Benefits (Per Person) | | | | | | | | |
| Medical Expenses | £10,000,000 | £50 | £10,000,000 | £50 | £10,000,000 | £35 | £10,000,000 | £10 |
| Hospital Benefit | £1,000* | – | £1,000* | – | £2,000* | – | £2,000* | – |
| Emergency Dental Treatment | £200 | £50 | £200 | £50 | £500 | £35 | £1000 | £10 |
| Personal Accident | £15,000* | – | £30,000* | – | £75,000* | – | £100,000* | – |
| Personal Liability | £2,000,000 | £100 | £2,000,000 | £100 | £2,000,000 | £100 | £2,000,000 | £100 |
| Legal Advice | £50,000 | – | £50,000 | – | £50,000 | – | £50,000 | – |
| Cancellation/Curtailment | £3,000 | £50 | £4,000 | £50 | £6,000 | £35 | £6,000 | £10 |
| Abandonment | £3,000 | – | £4,000 | – | £6,000 | – | £6,000 | – |
| Delayed Departure | £100* | £50 | £200* | £50 | £350* | £35 | £350* | £10 |
| Missed Departure | £600 | – | £600 | – | £1000 | – | £1000 | – |
| Personal Possessions | £1,500* | £50 | £1,500* | £50 | £3,000* | £35 | £3,000* | £10 |
| Delayed Personal | | | | | | | | |

SINGLE WEB-PAGE 200

PARAMETER-REQUEST PANEL 410

TRANSACTION-OPTIONS PANEL 430

FIG. 8 travel insurance quote trip details
- Annual Multi-trip
- Europe
- ○ Find your Travel Region
- 08/09/2008 — *812*
- Adult(s) 19-65 yrs: 1
- Senior(s) 66-75 yrs: 0
- Student(s) 19-22 yrs: 0
- Children(s) 02-18 yrs: 0
- Infant(s) under 2 yrs: 1
- Couple

*PARAMETER-REQUEST PANEL 810* summary of cover
Premier Plus World Wide
£58.00 — *834*

◁ Back to Cover options

| | |
|---|---|
| Destination: | Europe |
| Policy Type (Trip Type): | Annual Multi-Trip |
| Policy Holder: | John Doe — *832* |
| Start Date: | 08/09/2008 |
| End Date: | 08/09/2009 |
| Trip Duration: | 365 days |
| Premium: | £57.13 |
| Tax: | £.87 |
| Total Price: | £58.00 |

| Benefits (Per Person) | Value | Excess |
|---|---|---|
| Medical Expenses | £10,000,000 | £35 |
| Hospital Benefit | £2,000* | - |
| Emergency Dental Treatment | £500 | £35 |

☑ Declarations Accepted — *538*

*TRANSACTION-COMPLETION PANEL 830* personal and payment details
Traveller 2 of 2

Additional Traveller: — *872*
title ▸
Amara   Doe   Age: 1

◁ Back   Done

Select Card Type: [CREDIT 1][CREDIT 2][CREDIT 3][CREDIT 4][CREDIT 5][CREDIT 6]
Card Number
Name On Card
Expiry Date: 1 ▸ 2008 ▸

Total Charges:£58.00
Purchase

*TRANSACTION-COMPLETION PANEL 840*

● HOME  ○ ABOUT US  ○ OUR PRODUCTS  ○ FAQS

FIG. 9 travel insurance quote trip details

- Annual Multi-trip
- Europe
- ○ Find your Travel Region
- 08/09/2008 ▦ *812*
- Adult(s) 19-65 yrs: 1
- Senior(s) 66-75 yrs: 0
- Student(s) 19-22 yrs: 0
- Children(s) 02-18 yrs: 0
- Infant(s) under 2 yrs: 1
- Couple summary of cover

Premier Plus
World Wide
£58.00

← Back to Cover options

| | |
|---|---|
| Destination: | Europe |
| Policy Type (Trip Type): | Annual Multi-Trip |
| Policy Holder: | John Doe |
| Additional Travellers: | Amara Doe |
| Start Date: | 08/09/2008 |
| End Date: | 08/09/2009 |
| Trip Duration: | 365 days |
| Premium: | £57.13 |
| Tax: | £.87 |
| Total Price: | £58.00 |

| Benefits (Per Person) | Value | Excess |
|---|---|---|
| Medical Expenses | £10,000,000 | £35 |
| Hospital Benefit | £2,000* | — |
| Emergency Dental | £500 | £35 |

✓ Declarations Accepted personal and payment details

Receiving your policy:
Please tell us how would you like to receive your policy documents.

☐ Post
☑ E-mail — *995*

< Back to edit

Visa Card
1111999928285656

John Doe

Expiry Date: 5 ▼ 2010 ▼

Total Charges £58.00

[Purchase]

*TRANSACTION-COMPLETION PANEL 840*

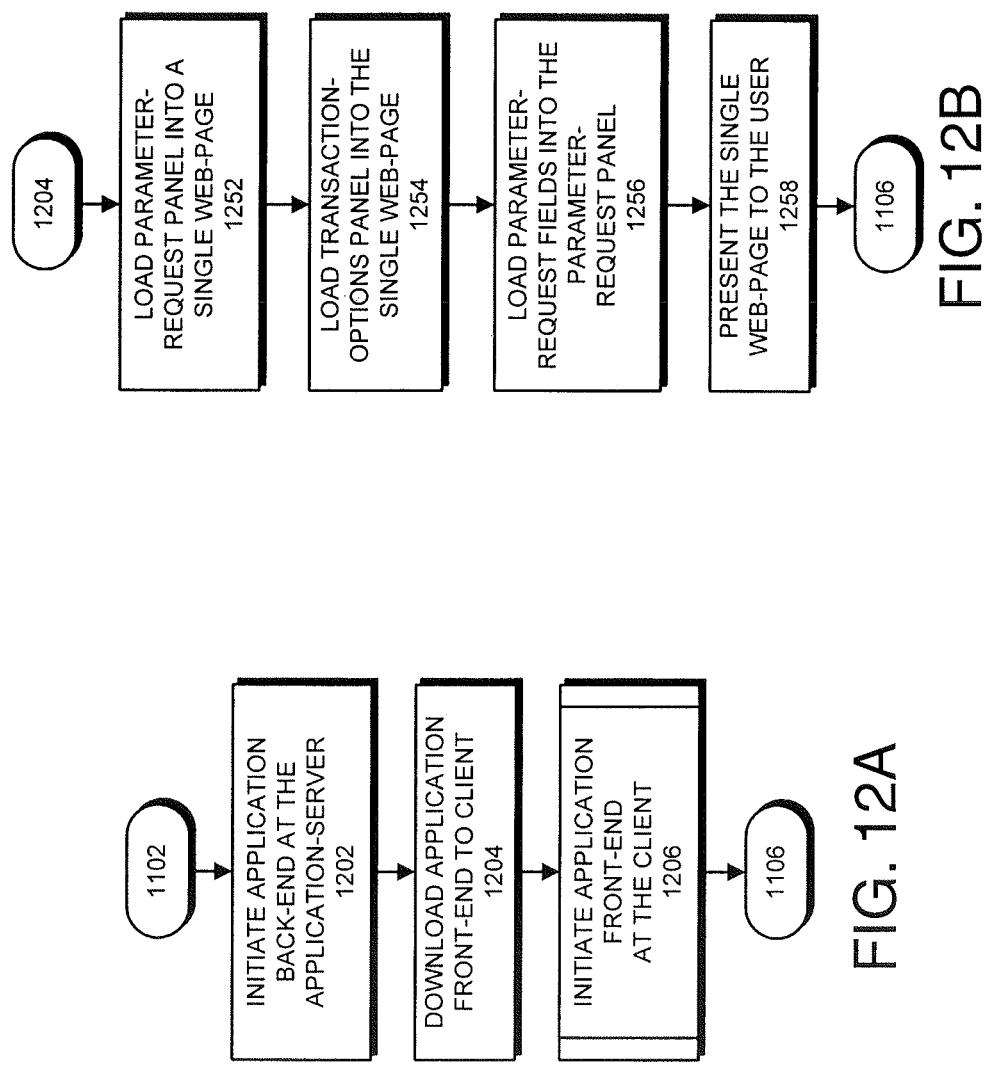

METHOD AND APPARATUS FOR PERFORMING A TRANSACTION

CROSS-REFERENCE TO RELATED APPLICATIONS

This patent application is a continuation of U.S. patent application Ser. No. 12/483,875, filed Jun. 12, 2009, which in turn claims the benefit of priority to U.S. Provisional Patent Application No. 61/061,209, filed Jun. 13, 2008, and both of which being entitled "METHOD AND APPARATUS FOR PERFORMING A TRANSACTION," and both of which being incorporated in their entireties herein by this reference.

BACKGROUND OF THE INVENTION

Product transactions can occur via electronic commerce ("eCommerce"). Typically, eCommerce involves a user accessing a product website, browsing a set of available products, and then completing the product transaction by selecting a product and providing payment information. However, typically only a small number of users who access the product website complete the product transaction. One reason for a user to drop off the product website is his frustration or impatience with navigating a complex product website. Even users who do complete a product transaction on the product website may be bothered by a cumbersome product website such that the user does not return to the product website, thereby resulting in reduced repeat business.

Many product websites use discrete web pages to present users with information relating to the product transaction. Each of these discrete web pages may include different types of information, or may request different types of data from a user. For example, one website may present one web page with a list of available products to a user. Upon the user, selecting an available product, the website may then present the user with a second web page, which includes information relating to the selected product. If the user wants to examine a different product, the user must then traverse back to the first web page to see the list of available products again. Each web page can present a perceptible delay to the user as data that will reside on that page is 'served' from the backend. The user can experience a distinct "timeout" period as he progresses through the transaction when the previous page is discarded and a new one is loaded.

A second problem with current product websites is that it can be difficult to compare products. For most users, it can be challenging to remember the details of different products when comparing a large number of products.

Hence, what is needed is an improved method and apparatus for performing a product transaction.

SUMMARY

Aspects of the disclosure relate to a system for performing a transaction. During operation, the system can receive an initiate-application command from a user at an application server. In response to receiving the initiate-application command, the system can initiate an application associated with the initiate-application command, wherein the application facilitates a transaction. The system presents a parameter-request panel to the user at a client, wherein the parameter-request panel includes a set of parameter-request fields. The system can receive transaction parameters from the user, wherein the user uses the set of parameter-request fields to send data for the transaction parameters to the application server. In response to receiving the transaction parameters, the system presents a transaction-options panel to the user without obscuring the parameter-request panel, wherein the transaction-options panel includes a set of transaction options associated with the transaction parameters the user provides. The system can receive from the user a transaction-option selection wherein at least one of the set of transaction options is selected. In response to receiving the transaction-option selection, the system presents a transaction-completion panel to the user without obscuring the parameter-request panel and the transaction-options panel, wherein the transaction-completion panel includes a set of transaction-completion fields associated with the transaction-option selection. The system can receive from the user transaction-completion information, wherein the user uses the transaction-completion fields to send the transaction-completion information to the application server. In response to receiving the transaction-completion information, the system can complete the transaction.

In some embodiments, the system presents a parameter-request panel that includes "Trip Details," a transactions-options panel that includes "Cover Options," and a transaction completion panel that includes "Personal and Payment Details" that is suitable for purchasing travel insurance from an insurance company. The system presents the Trip Details parameter-request panel to the user at a client, wherein the Trip Details parameter-request panel includes a set of parameter-request fields relating to a trip, such as travel destination, trip length and date, and number of travelers, for example. The system can receive transaction parameters from the user, wherein the user uses the set of parameter-request fields to send data for the transaction parameters to the application server. In response to receiving the transaction parameters, the system presents a Cover Options transaction-options panel to the user without obscuring the Trip Details parameter-request panel, wherein the Cover Options transaction-options panel includes a set of insurance coverage options associated with the transaction parameters the user provides. The system can receive from the user a transaction-option selection wherein at least one of the set of insurance coverage options is selected. In response to receiving the transaction-option selection, the system presents the Personal and Payment Details transaction-completion panel to the user without obscuring the Trip Details parameter-request panel and the Cover Options transaction-options panel, wherein the Personal and Payment Details transaction-completion panel includes a set of transaction-completion fields associated with traveler bibliographic information, including name and contact information, for example, and payment information, including credit card number and expiration date, for example. The system can receive from the user transaction-completion information, wherein the user uses the transaction-completion fields to send the transaction-completion information to the application server. In response to receiving the transaction-completion information, the system can complete the transaction.

In another embodiment, the transaction-options panel can serve as an information hub for the user. In this embodiment, when the user modifies a predetermined field in the transaction-completion panel, the transaction application can modify the detail information in the hub based upon the change to the field in the transaction-completion panel. The user can view the modified detail information associated in the transaction-options panel. Similarly, when the user modifies a predetermined field in the parameter-request panel, the transaction application can update the set of transaction options in the hub based upon the change to the field in the parameter-request panel. The user can view the updated set of transaction options in the transaction-options panel.

In a further variation, each time the transaction application modifies or updates the set of transaction options or the detail information associated with one of the transaction options, the transaction application can provide a visual indicator for the user to confirm that a change in the information hub has taken place, such as an animation depicting the new information replacing the old information, for example.

In a variation, initiating the application involves initiating an application back-end at the application server, wherein the application back-end performs server-side processing associated with the application. The system can download to the client an application front-end, wherein the application front-end performs client-side processing associated with the application. The system can initiate the application front-end at the client.

In some embodiments, the state of a panel can toggle between inactive in which the user cannot interface with the panel and active in which the user can interface with at least a portion of the panel to help a user navigate through the panels in a sequential and/or logical manner to complete the transaction. In one variation, initiating the application front-end involves loading the parameter-request panel into a single web page, wherein a single, primary field is visible. The system can load the set of parameter-request fields into the parameter-request panel. The parameter-request panel is active such that a user can interact with the parameter-request panel to use the set of parameter-request fields to send data for the transaction parameters to the application server. The system can load the transaction-options panel into the single web page such that it is visible. The transaction-options panel is inactive in that the user cannot interact with the transaction-options panel to make a transaction-option selection. The system can present the single web page to the user at the client. In response to receiving transaction parameters from the user, the system can change the state of the transaction-options panel from inactive to active and load a set of transaction options which become visible in the transaction-options panel.

In some embodiments, the state of a panel can be indicated by a visual indicator such that a user can have a ready, visual identifier that the panel is in an active state in which the user can interface with at least a portion of the panel or an inactive state in which the user cannot interface with that panel. For example, in a variation, an active panel can have a different brightness or illumination than an inactive panel. In a variation, an active panel can be brighter than an inactive panel.

In another variation, presenting the transaction-options panel to the user involves loading the set of transaction options into the transaction-options panel. The system can load data associated with each transaction option from the set of transaction options into the transaction-options panel. The system can make the transaction-options panel active without modifying the parameter-request panel.

In another variation, in response to receiving the transaction-option selection, the system replaces the set of transaction options included in the transaction-options panel with detail information associated with the transaction-option selection.

In a further variation, after receiving the transaction-option selection, the system reduces the size of the transaction-options panel, displays the detail information associated with the transaction-option selection in the transaction-options panel, and makes the transaction-completion panel visible. In response to receiving a request to re-review the set of transaction options, the system can hide the transaction-completion panel, restore the transaction-options panel to its original size, and replace the detail information associated with the transaction-option selection with the set of transaction options.

In a further variation, after receiving the transaction-completion information, the system updates the detail information in the transaction-options panel to include information associated with the transaction-completion information.

In another variation, presenting the transaction-completion panel to the user involves reducing the size of the transaction-options panel from its original size to a reduced size. The system can load the transaction-completion panel into the single web page. The system can make the transaction-completion panel active such that a user can interact with it without modifying the parameter-request panel and without making additional modifications to the transaction-options panel.

In yet another variation, completing the transaction involves confirming the transaction. Completing the transaction can include transferring a predetermined sum of money from the user. The system can create confirmation documents. The system can send the confirmation documents to the user.

In yet another variation, the system can receive new transaction parameters from the user. In response to receiving the new transaction parameters, the system modifies the set of transaction options to include a new set of transaction options associated with the new transaction parameters. The system modifies the set of transaction-completion fields to include a new set of transaction-completion fields associated with the new set of transaction options.

In a further variation of the present invention, the system can receive new transaction parameters from the user. In response to receiving the new transaction parameters, the system modifies the set of transaction options to revise a parameter set applicable to the set of transaction options associated with the new transaction parameters. The system modifies the set of transaction-completion fields to include a new set of transaction-completion fields associated with the new set of transaction options.

In a variation, the transaction can include: a product transaction, which involves purchasing a product; a service transaction, which involves purchasing a service; a configuration transaction, which involves configuring the application; and an information transaction, which involves presenting information to the user.

BRIEF DESCRIPTION OF THE DRAWINGS

FIG. 2 illustrates an embodiment of a single web page suitable for use with the system of FIG. 1.

FIG. 4 is the single web page of FIG. 2, illustrating a set of transaction options.

FIG. 5 is the single web page of FIG. 2, illustrating detail information associated with a transaction-option selection.

FIG. 7 is the single web page of FIG. 2, illustrating a transaction-completion panel.

FIG. 8 is the single web page of FIG. 2, illustrating updated detail information.

FIG. 9 is the single web page of FIG. 2, illustrating a payment sub-panel.

FIG. 12A presents a flowchart illustrating an embodiment of a process for initiating a transaction application.

FIG. 12B presents a flowchart illustrating an embodiment of a process for initiating an application front-end.

DETAILED DESCRIPTION OF EMBODIMENTS OF THE INVENTION

Figure 1:
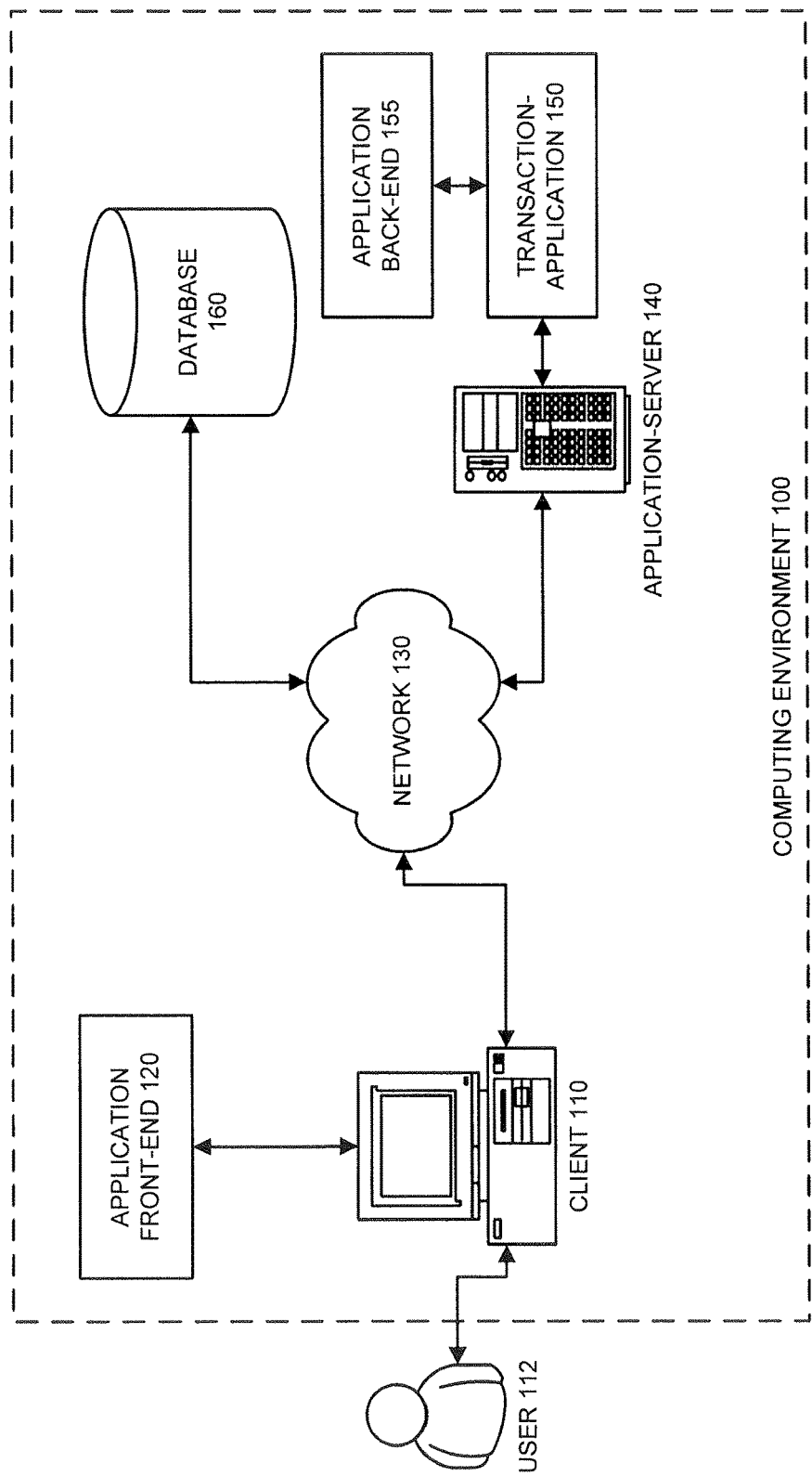
FIG. 1 illustrates a computing environment in accordance with an embodiment of a system for performing a transaction.

A system and method for performing a transaction can allow a user to perform a multi-step process on a single web page. In one embodiment, a transaction application is provided that facilitates performing a transaction. The transaction application can enable a user to complete the transaction by interacting with the single web page. The single web page can include any number of panels to facilitate the transaction. By resizing the panels associated with the single web page, adjusting which panels are active at a specific point within the transaction process, making use of dialog boxes, replacing panels with related panels, and using sub-panels, the transaction application can facilitate the user completing a transaction via the single web page without visiting a second web page.

In one embodiment, the single web page can include three panels: a parameter-request panel, a transaction-options panel, and a transaction-completion panel. Note that in other embodiments the single web page can include a different number of panels. For example, a transaction to rent a car can include four panels, and a transaction to hire a babysitter can include two panels.

In one embodiment, the transaction application can present each panel at the same time to the user, or the transaction application can present a subset of the panels to the user at any given point in the transaction process. For example, the transaction application can present to the user the parameter-request panel and the transaction-options panel when the transaction application initiates. The transaction application can then present the user with the transaction-completion panel after the user selections a transaction option from the transaction-options panel.

In one embodiment, the parameter-request panel enables the user to specify the type of transaction the user desires to complete. For example, using the parameter-request panel, the user can specify a type of travel insurance to purchase, the length of time the user plans to travel, the number of travelers that will be included in the user's travel party, the region within which the user plans to travel, and the type of group, if any, that the user plans to travel with. Note that the parameter-request panel is not limited to specifying travel insurance. For example, the user can use the parameter-request panel to identify software to purchase, a painter to hire, an automobile to purchase, or any other type of transaction that a transaction application can process.

In one embodiment, the parameter-request panel remains visible and accessible during the entire transaction process. This embodiment enables the user to change transaction parameters at any point prior to completing the transaction.

In one embodiment, the user or the transaction application can resize the parameter-request panel. This embodiment enables the user to make the parameter-request panel more accessible. Furthermore, this embodiment enables the transaction application to provide more screen space for additional panels.

In one embodiment, the parameter-request panel maintains a static size and shape. This embodiment ensures that the user can easily access the parameter-request panel at any point prior to completing the transaction.

In one embodiment, the transaction-options panel enables the user to view a set of transaction options associated with the transaction parameters the user specified using the parameter-request panel. Note that the transaction application can present to the user all of the transaction options associated with the transaction parameters, or only a subset of the available transaction options. Furthermore, note that a transaction option can be any product or service that matches the transaction parameters the user specified using the parameter-request panel.

In one embodiment, upon selecting a transaction option to view in more detail, the transaction application can replace the transaction options displayed in the transaction-options panel with detail information associated with the selected transaction option. For example, the transaction application can present the user with information relating to the calculation of the service or product price. In a second example, the transaction application can present the user with detailed specifications of the selected transaction option, such as the specifications of a computer that the user selected for possible purchase.

In one embodiment, the user can select to review the set of transaction options associated with the transaction parameters. In this embodiment, the transaction application can replace the detail information with the set of transaction options.

In one embodiment, any change the user makes to the transaction parameters while the user is viewing the detail information the transaction application reflects in the set of transaction options, even if they are not visible when the user makes the change to the transaction parameters. In this embodiment, if the user chooses to review the set of transaction options, the user will see updated transaction options upon the transaction application presenting the user with the set of available transaction options. Note that the transaction application will also update the detail information the user is viewing in response to any changes to the transaction parameters.

In one embodiment, the transaction application can present the detail information in a dialog box, or a new panel. In this embodiment, the transaction application can present the detail information to the user without obscuring the set of transaction options from the user's view.

In one embodiment, the transaction-completion panel enables the user to specify payment information, shipping information, user-specific information, and any other information that the transaction application requires to complete the transaction for the selected transaction option.

In one embodiment, the transaction application resizes the transaction-options panel to present the user with the transaction-completion panel.

In one embodiment, the transaction application can present the user with a confirmation panel, which includes information confirming the transaction that the user completed. In this embodiment, the transaction application can replace one or more of the existing panels with the confirmation panel.

In one embodiment, the transaction application can make one or more of the panels, sub-panels, or fields un-editable by making the one or more of the panels, sub-panels, or fields inactive, hidden, and/or locked.

In one embodiment, the transaction application can make one or more of the panels, sub-panels, or fields editable by making the one or more of the panels, sub-panels, or fields active, visible, and/or unlocked.

In one embodiment, the transaction application can use Flash, Flex, Java, ActiveX, or any other type of software development kit or tool that facilitates creating Rich Internet Applications (RIAs).

In one embodiment, the transaction application can store and access data relating to the transaction by using an eXtensible Markup Language (XML) file format, a flat file, dynamic data storage, a database, or any other type of system for facilitating storing and accessing data.

In one embodiment, the transaction-options panel can serve as an information hub for the user. In this embodiment, when the user modifies a predetermined field in the parameter-request panel, the transaction application makes a change to the set of transaction options displayed in the transaction-options panel. Similarly, when the user completes or modifies a predetermined field in the transaction-completion panel, the transaction application updates the detail information associated with the transaction-option selection. The user can view the modified detail information associated with the transaction-option selection in the transaction-options panel.

In one embodiment, each time the transaction application modifies the set of transaction options or the detail information associated with the transaction-option selection, the transaction application can animate the occurrence of the modification. For example, if the user enters a name into a name field associated with the transaction-completion panel, the transaction application can show the user an animation of the name sliding into the detail information associated with the transaction-option selection. This embodiment enables the transaction application to help focus the user's attention on the transaction-options panel (or hub) each time the user makes a change to another panel that causes a change in the information displayed in the hub. In other embodiments, other animation effects can be used such as slowly vanishing text, slowly appearing text, varying degrees of brightness, changes in color, arrows pointing to the changed information, circles around the changed information, etc.

Computing Environment

FIG. 1 illustrates an embodiment of a computing environment 100. The computing environment 100 can include a number of computer systems, which generally can include any type of computer system based on: a microprocessor, a mainframe computer, a digital signal processor, a portable computing device, a personal organizer, a device controller, or a computational engine within an appliance. More specifically, the computing environment 100 includes a client 110, an application front-end 120, a network 130, an application server 140, a transaction application 150, an application back-end 155, and a database 160.

The client 110 can generally include any node on a network including computational capability and including a mechanism for communicating across the network. In one embodiment, the client 110 hosts the application front-end 120.

The application front-end 120 can generally include any component of an application, such as transaction application 150, that can receive input from the user 112 or the client 110, communicate the input to the application, receive output from the application, and present the output to the user 112 or the client 110. In one embodiment, the application front-end 120 can be a stand-alone system.

The network 130 can generally include any type of wired or wireless communication channel capable of coupling together computing nodes. This includes, but is not limited to, a local area network, a wide area network, or a combination of networks. In one embodiment, the network 130 comprises the Internet.

The application server 140 can generally include any computational node including a mechanism for servicing requests from a client for computational resources, data storage resources, or a combination of computational and data storage resources. Furthermore, the application server 140 can generally include any system that can host the transaction application 150. In one embodiment, the application server 140 hosts the transaction application 150.

The transaction application 150 can generally include any application for facilitating a transaction. In one embodiment, the transaction application 150 can be a stand-alone system.

In some embodiments, the transaction application 150 can include the application front-end 120 and the application back-end 155. In one embodiment, the transaction application 150, the application front-end 120, and the application back-end 155 are independent of each other. In this embodiment, the transaction application 150, the application front-end 120, and the application back-end 155 can each communicate with each other via the network 130, or through any other system for facilitating communication between independent systems.

In one embodiment, the transaction can include: a product transaction, which involves purchasing a product; a service transaction, which involves purchasing a service; a configuration transaction, which involves configuring an application (such as transaction application 150); an information transaction, which involves retrieving information to present to user 112; and any other type of transaction that a computing device or application can facilitate.

The application back-end 155 can generally include any component of an application, such as the transaction application 150, that can process data, interact with the database 160, and execute business logic for the application. In one embodiment, the application server 140 hosts the application back-end 155. In one embodiment, the application back-end 155 can be a stand-alone system.

The database 160 can generally include any type of system for storing data in non-volatile storage. This includes, but is not limited to, systems based upon: magnetic, optical, and magneto-optical storage devices, as well as storage devices based on flash memory and/or battery-backed up memory. In one embodiment, database 160 can store data associated with a transaction.

The user 112 can generally include: an individual, a group of individuals, an organization, a group of organizations, a computing system, a group of computing systems, or any other entity that can interact with computing environment 100. In one embodiment, the user 112 can be a client.

Single Web Page

Figure 2:
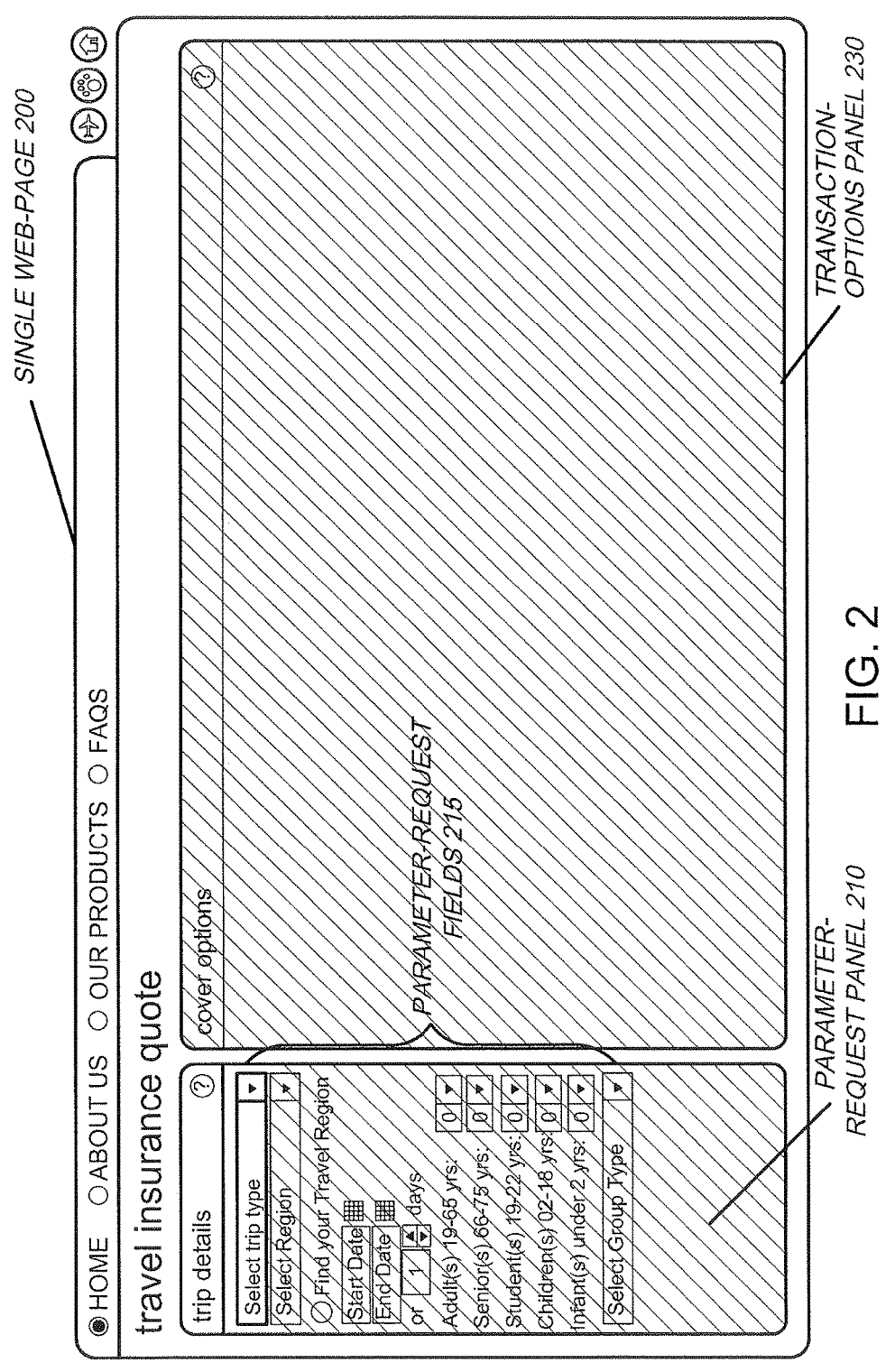

FIG. 2 illustrates an embodiment of a single web page 200. The single web page 200 can generally include any number of panels that can facilitate a transaction. Each panel can include any number and type of input fields for obtaining information from the user 112 and any number and type of output fields for presenting information to the user 112. In this embodiment, the single web page 200 includes a parameter-request panel 210 and a transaction-options panel 230.

The parameter-request panel 210 includes parameter-request fields 215 for obtaining a set of transaction parameters from the user 112. The transaction application 150 can use the set of transaction parameters to determine a set of transaction options to present to the user 112. Note that, although this embodiment illustrates a set of parameter-request fields for determining available travel insurance options, the parameter-request fields can include fields for determining options for any type of transaction. For example, the parameter-request panel 210 can include parameter-request fields for facilitating the purchase of an automobile, the contracting of a plumber, or any other type of product or service that the user 112 can purchase via a transaction application.

The transaction-options panel 230 illustrates an empty, inactive panel that is dimmed. This panel indicates to the user 112 that the transaction application 150 includes more functionality that can be accessed by interacting with the parameter-request panel 210.

In one embodiment, the single web page 200 includes only the parameter-request panel 210. In this embodiment, the parameter-request panel 210 may remain the same size and shape as illustrated in FIG. 2, or the parameter-request panel 210 may extend to the combined size of the parameter-request panel 210 and the transaction-options panel 230.

In one embodiment, the transaction-options panel 230 can be in an active state which is illuminated.

In one embodiment, the transaction-options panel 230 can include fields for obtaining information from user 112 and fields for presenting information to user 112.

Parameter-Request Dialog Box

Figure 3:
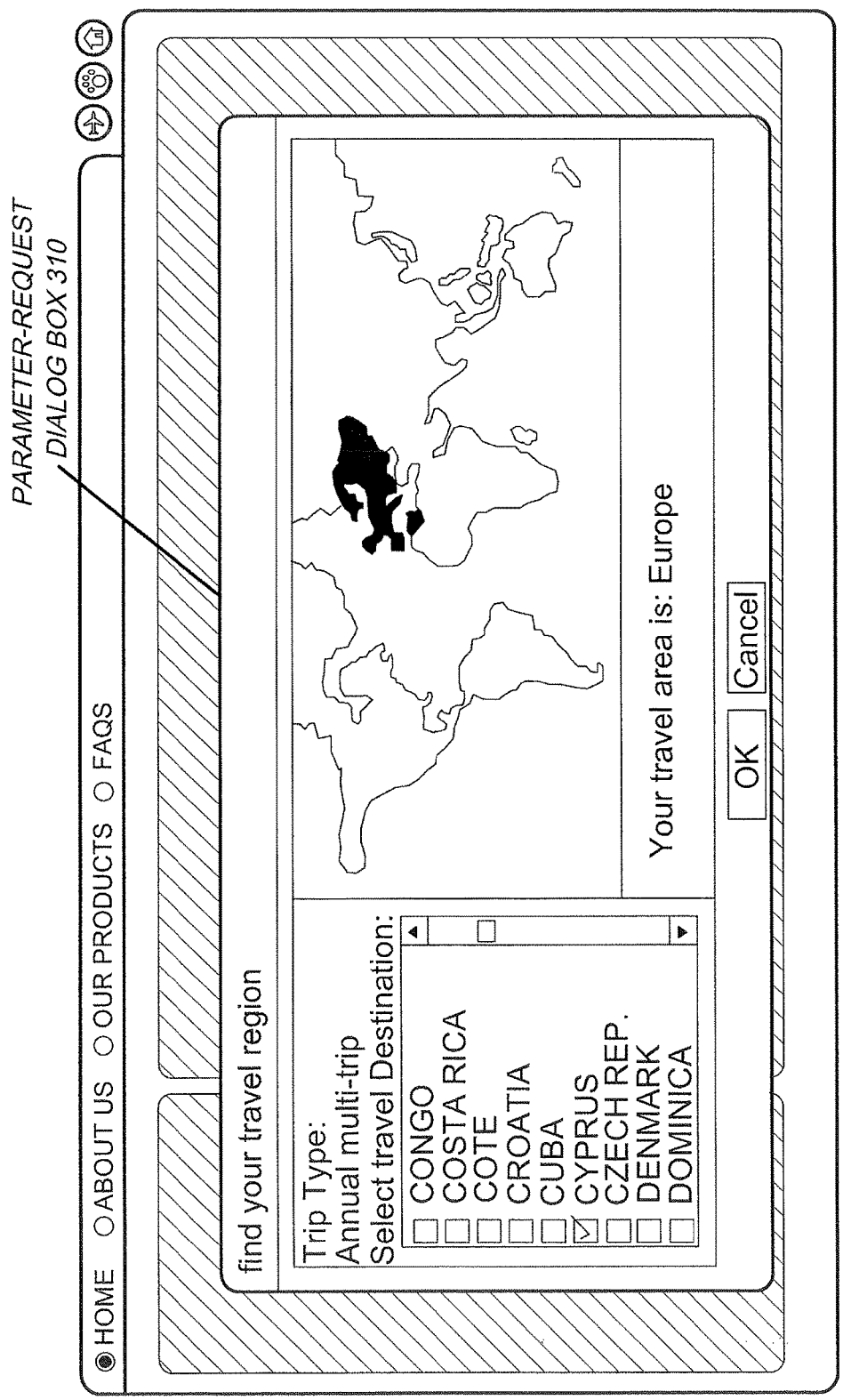
FIG. 3 illustrates an embodiment of a parameter-request dialog box suitable for use with the system of FIG. 1.

FIG. 3 illustrates an embodiment of a parameter-request dialog box 310. The parameter-request dialog box 310 can include any number and type of input fields for obtaining information from the user 112 and any number and type of output fields for presenting information to the user 112. In this embodiment, the transaction application 150 can use the parameter-request dialog box 310 in conjunction with the parameter-request panel 210 to optimize obtaining information from the user 112 and presenting information to the user 112. For example, the parameter-request dialog box 310 can help the user 112 select a travel destination.

Set of Transaction Options

FIG. 4 illustrates an embodiment of a set of transaction options. In this embodiment, the single web page 200 includes a parameter-request panel 410 and a transaction-options panel 430.

Note that the parameter-request panel 410 of FIG. 4 is equivalent to the parameter-request panel 210 of FIG. 2. However, the parameter-request panel 410 of FIG. 4 includes transaction parameters received from the user 112. For example, an adult tally 412 specifies a number of adults who desire to purchase travel insurance and a group type 414 specifies the type of group searching for travel insurance, such as a family, a single individual, or an organization.

Furthermore, note that the transaction-options panel 430 of FIG. 4 is equivalent to the transaction-options panel 230 of FIG. 2. However, the transaction-options panel 430 of FIG. 4 includes: policy data 420, which display the components associated with each transaction option; price-breakdown columns 432, which display the price associated with each product component; total-price indicators 434, which display the total price for each product; and product selectors 436, which enable user 112 to select a transaction option associated with one of the product selectors 436.

In one embodiment, the transaction-options panel 430 is a different panel from the transaction-options panel 230. In this embodiment, upon the user 112 entering transaction parameters, the transaction application 150 replaces the transaction-options panel 230 with the transaction-options panel 430, which displays a set of transaction options associated with the transaction parameters that the user 112 provides.

In one embodiment, the transaction-options panel 430 presents every transaction option associated with the transaction parameters that the transaction application 150 receives from the user 112.

In one embodiment, the transaction-options panel 430 presents a subset of available transaction options associated with the transaction parameters that the transaction application 150 receives from the user 112. In this embodiment, the user 112 or the transaction application 150 may determine the number of transaction options that the transaction application 150 presents to the user 112.

Detail Information

Figure 5:
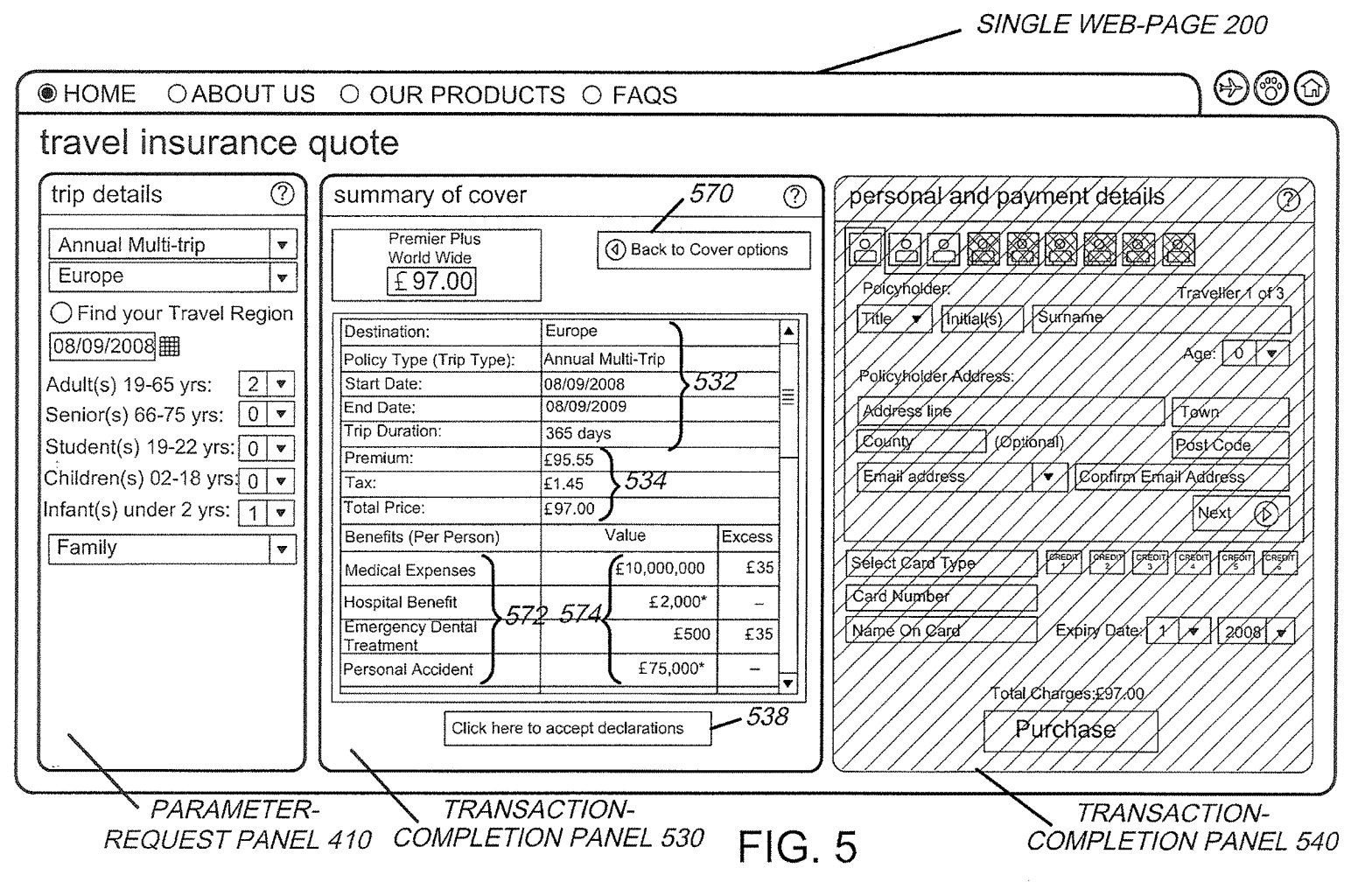

FIG. 5 illustrates an embodiment of detail information associated with a transaction-option selection. In this embodiment, the single web page 200 includes a parameter-request panel 410, a transaction-options panel 530, and a transaction-completion panel 540.

Note that the transaction-options panel 530 of FIG. 5 is equivalent to transaction-options panel 430 of FIG. 4. However, the transaction application 150 replaced the transaction-option fields illustrated in the transaction-options panel 430 of FIG. 4 with detail-information fields in response to receiving a transaction-option selection from user 112. In one embodiment, the detail-information fields can include: summary of transaction parameters 532; a price breakdown 534; a declaration button 538, which enables the user 112 to access a set of declarations the user 112 is required to acknowledge before the transaction may continue; a back to cover options button 570, which enables the user 112 to review the set of transaction options; policy data 572, which display the components associated with the transaction-option selection; a price-breakdown column 574, which displays the price associated with the transaction-option selection; and any other data that can be associated with the transaction-option selection.

In one embodiment, the transaction-options panel 530 can be a different panel from the transaction-options panel 430. In this embodiment, the transaction application 150 replaces the transaction-options panel 430 of FIG. 4 with the transaction-options panel 530 of FIG. 5.

The transaction-completion panel 540 can generally include any number and type of input fields for obtaining information from the user 112 and any number and type of output fields for presenting information to the user 112. In one embodiment, the transaction-completion panel 540 includes fields relating to obtaining payment information and traveler-detail information from the user 112.

In one embodiment, the transaction-completion panel 540 can include any field that can facilitate the transaction application 150 completing the transaction with the user 112.

In one embodiment, the transaction-completion panel 540 is inactive until the user 112 accepts a set of declarations that the user 112 accesses by clicking the declaration button 538. In response to accepting the set of declarations, the transaction application 150 makes the transaction-completion panel 540 active.

In one embodiment, the transaction application 150 makes the transaction-completion panel 540 active when creating the transaction-completion panel 540.

In one embodiment, the transaction application 150 creates the transaction-completion panel 540 when creating the parameter-request panel 210 and the transaction-options panel 230. In this embodiment, the transaction application 150 does not wait for a separate trigger, such as the user 112 accepting a set of declarations that the user 112 accesses by clicking the declaration button 538, from the user 112 before creating the transaction-completion panel 540.

Declarations Dialog Box

Figure 6:
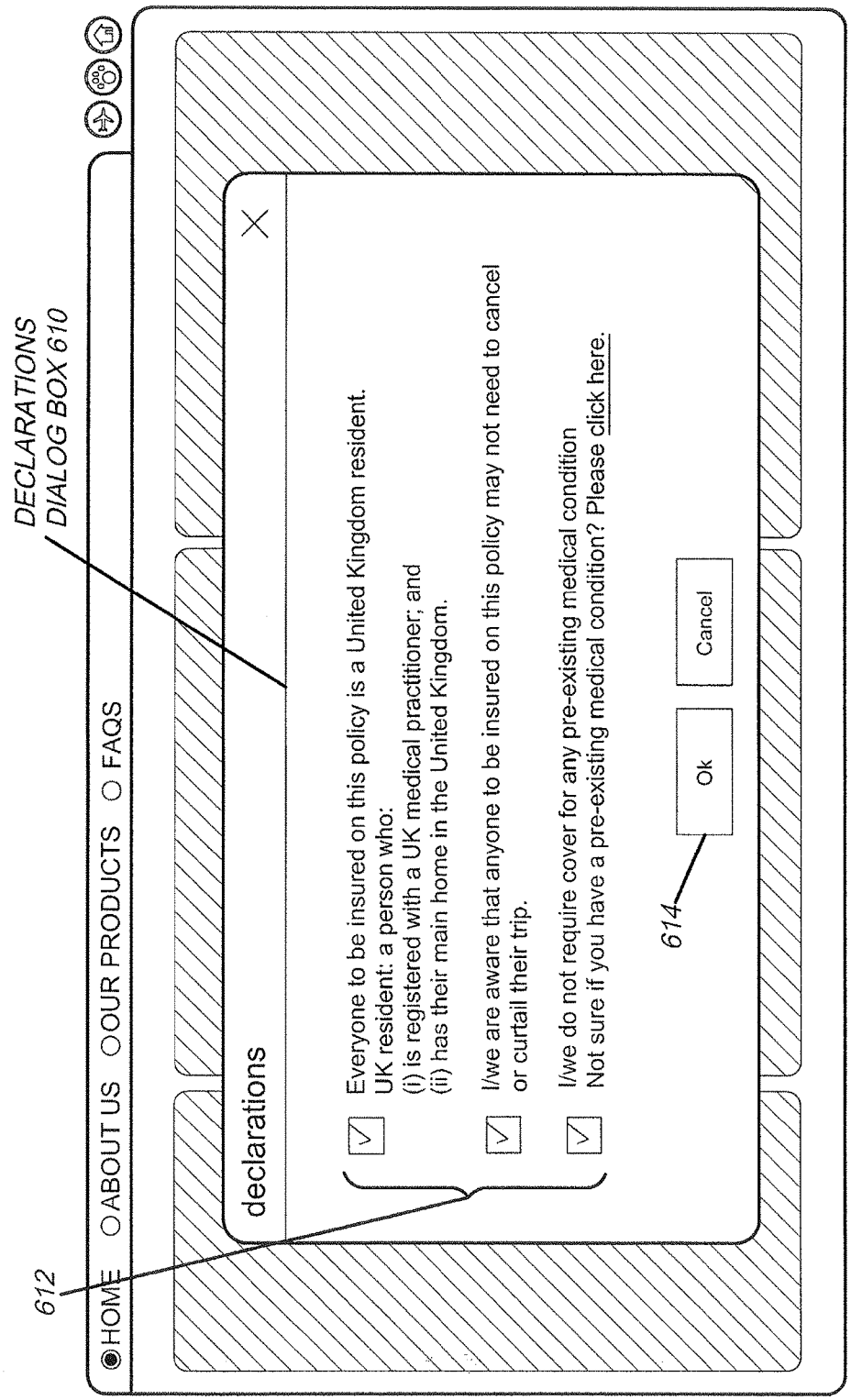
FIG. 6 illustrates an embodiment of a declarations dialog box suitable for use with the system of FIG. 1.

FIG. 6 illustrates an embodiment of a declarations dialog box 610. The declarations dialog box 610 can include any number and type of input fields for obtaining information from the user 112 and any number and type of output fields for presenting information to the user 112. In this embodiment, the transaction application 150 uses the declarations dialog box 610 to request that the user 112 certify a set of pre-conditions, a set of declarations 612, before continuing the transaction. If the user 112 is willing to certify the accuracy of the set of declarations 612, then the user 112 can select an "ok" button 614 to continue with the transaction.

Transaction-Completion Panel

Figure 7:
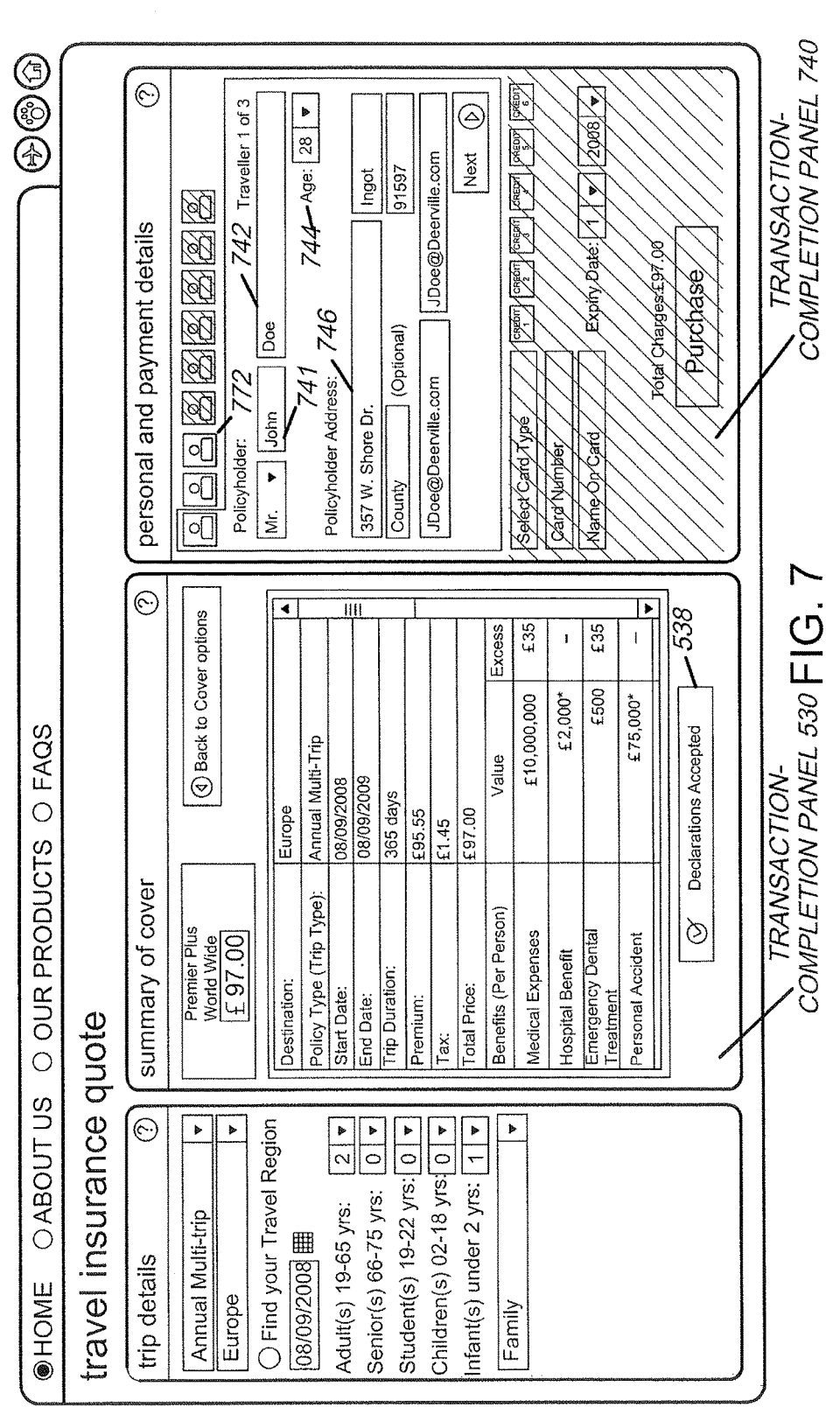

FIG. 7 illustrates an embodiment of a transaction-completion panel 740. Note that the transaction-completion panel 740 of FIG. 7 is equivalent to the transaction-completion panel 540 of FIG. 5, but, in response to the user 112 accepting the set of declarations 612 in the declarations dialog box 610, the transaction application 150 makes the transaction-completion panel 740 active.

In one embodiment, the transaction application 150 can make a sub-section, traveler-detail panel 772 of the transaction-completion panel 740 active. In other embodiments, the transaction application 150 can make the entire transaction-completion panel 740 active.

The traveler-detail panel 772 can generally include any number and any type of input fields for obtaining information from the user 112 and any number and type of output fields for presenting information to the user 112. In one embodiment, the traveler-detail panel 772 includes a first name field 741, a last name field 742, an age field 744, and a street address field 746.

In one embodiment, the transaction application 150 can insert information obtained via the transaction-completion panel 740 into the transaction-options panel 530 as illustrated in FIG. 8 with reference to the transaction-options panel 830, which includes information from the first name field 741 and the last name field 742 as part of a policyholder name 832.

Updated Detail Information

FIG. 8 illustrates an embodiment of updated detail information. In this embodiment, the user 112 updates the parameter-request panel 410 to include one fewer adult. Note that the parameter-request panel 810 of FIG. 8 is equivalent to the parameter-request panel 410 of FIG. 4, but the parameter-request panel 810 of FIG. 8 reflects the update the user 112 makes to the adult tally 412 as illustrated by the adult tally 812.

The transaction-options panel 830 of FIG. 8 is equivalent to the transaction-options panel 530 of FIG. 5, but the transaction-options panel 530 includes an updated total-price indicator 834 to reflect the changes the user 112 makes to the adult tally 812. Furthermore, the transaction-options panel 830 includes the addition of the policyholder name 832, which the transaction application 150 obtains from the user 112 via the transaction-completion panel 740.

The transaction-completion panel 840 illustrates a reduction in the number of traveler-detail panels 872 the user 112 can access in response to the reduced adult tally 812.

In one embodiment, modifications to the parameter-request panel 810 will cause the transaction application 150 to place the transaction-completion panel 840 in an inactive state until the user 112 recertifies the accuracy of the set of declarations 612. This embodiment is to ensure that the user 112 does not make modifications to the transaction parameters that take the user 112 out of compliance with the set of declarations 612.

Payment Sub-Panel

FIG. 9 illustrates an embodiment of a payment sub-panel 990. Note that the transaction-completion panel 840 includes the payment sub-panel 990. The payment sub-panel 990 can include any number and type of input fields required to obtain payment information from the user 112. Note that the payment sub-panel 990 may also include output fields for facilitating communication with the user 112. In this embodiment, the transaction application 150 makes the payment sub-panel 990 active only after the user 112 completes the traveler-detail panels 872.

In one embodiment, the transaction application 150 makes the payment sub-panel 990 active upon creating the transaction-completion panel 840.

In one embodiment, the transaction-completion panel 840 includes a policy-receipt window 995. The policy-receipt window 995 can include any number and type of input field required to obtain a shipping method selection for a purchased product. Note that the policy-receipt window 995 may also include output fields for facilitating communication with the user 112.

Confirmation Panel

Figure 10:
FIG. 10 illustrates an embodiment of a confirmation web page suitable for use with the system of FIG. 1.

FIG. 10 illustrates an embodiment of a confirmation panel 1010. The confirmation panel 1010 can generally include any number and type of output fields for presenting confirmation information to the user 112. Note that the confirmation panel 1010 may also include input fields for facilitating communication between the user 112 and the transaction application 150. In this embodiment, the confirmation panel 1010 includes links 1020 to confirmation documents, which enable the user 112 to obtain confirmation of a transaction that the user 112 completes via the transaction application 150.

Performing a Transaction

Figure 11:
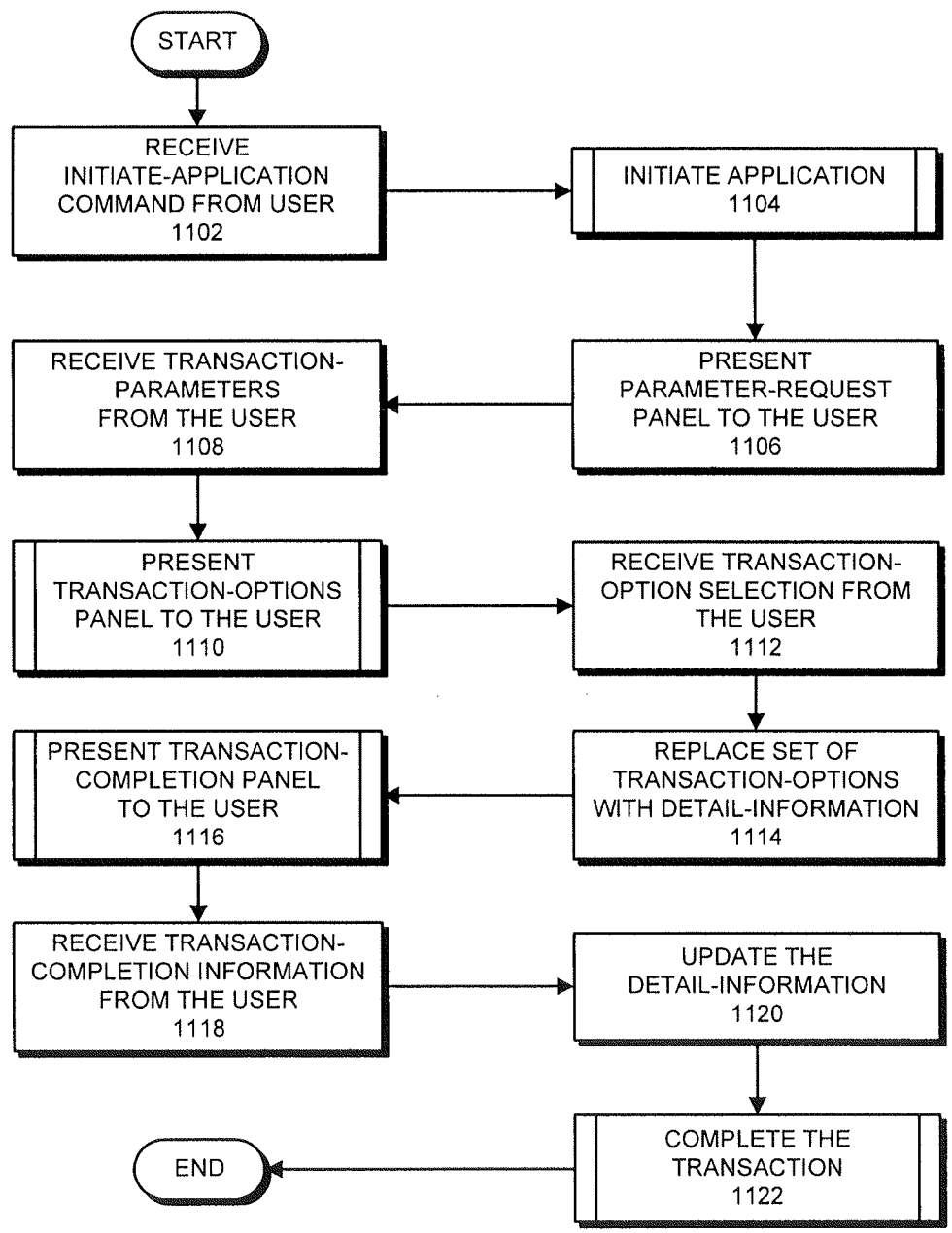
FIG. 11 presents a flowchart illustrating an embodiment of a process for performing a transaction.

FIG. 11 presents a flowchart illustrating an embodiment of a process for performing a transaction. The process begins when the application server 140 receives an initiate-application command from the user 112 via the client 110 (operation 1102). In response to receiving the initiate-application command, the application server 140 initiates the transaction application 150 (operation 1104). Note that operation 1104 can be a multi-step operation, which is described in more detail with reference to FIG. 12A.

Next, the transaction application 150 uses the application front-end 120 to present the parameter-request panel 210 to the user 112 (operation 1106). Note that the parameter-request panel 210 can include any number and any type of parameter-request fields, which facilitate the application front-end 120 receiving input from the user 112 and presenting output to the user 112 relating to the identification of available transaction options. For example, in this embodiment the parameter-request panel 210 includes: a trip-type selector 212, which enables the user 112 to select a type of trip; a region selector 214, which enables the user 112 to select the region of the world to which the user 112 desires to travel; a start-date selector 216, which enables the user 112 to select when the user 112 plans to begin travel; an end-date selector 218, which enables the user 112 to select when the user 112 plans to end travel; a group-consistency selectors 220, which enable the user 112 to select the consistency of a travel group; and a group-type selector 222, which enables the user 112 to select the type of travel group.

In one embodiment, transaction options can include any type of transaction that a transaction application can process. For example, a set of transaction options can include various types of trip insurance. In a second example, a set of transaction options can include various types of products or services related to a search term.

The transaction application 150 can receive transaction parameters via the application front-end 120 from the user 112 who uses the parameter-request fields to enter the transaction parameters (operation 1108). In response to receiving the transaction parameters, the transaction application 150 uses the application front-end 120 to present the transaction-options panel 430 to the user 112, which includes a set of transaction options (operation 1110). Note that the application front-end 120 presents the transaction-options panel 230 to the user 112 without obscuring the parameter-request panel 210. Furthermore, note that operation 1110 can be a multi-step operation, which is described in more detail with reference to FIG. 13.

In one embodiment, the transaction application 150 presents the transaction-options panel 430 to the user 112 after the user 112 specifies a value for each parameter-request field associated with the parameter-request fields 215.

In one embodiment, the transaction application 150 can present the transaction-options panel 430 to the user 112 after the user 112 specifies a value for the group type 414, a predetermined single parameter-request field that the transaction application 150 specifies, or a predetermined set of parameter-request fields that the transaction application 150 specifies.

In one embodiment, the transaction application 150 begins presenting the set of transaction options to the user 112 as soon as the user 112 has specified enough transaction parameters for the transaction application 150 to determine a set of transaction options. Note that this may be before the user 112 has finished specifying all transaction parameters.

Next, the transaction application 150 receives from the user 112 a transaction-option selection associated with the set of transaction options (operation 1112). The transaction application 150 then uses the application front-end 120 to replace the set of transaction options included in the transaction-options panel 430 with detail information associated with the transaction-option selection, as illustrated by the transaction-options panel 530 (operation 1114). Note that this detail information can include: a summary of transaction parameters 532; a price breakdown 534; policy data 572 associated with the transaction-option selection; a price-breakdown column 574, which displays the price associated with the transaction-option selection; and any other data that can be associated with the transaction-option selection.

In one embodiment, the application front-end 120 replaces the set of transaction options included in the transaction-options panel 430 with detail information by replacing the transaction-options panel 430 of FIG. 4 with the transaction-options panel 530 of FIG. 5.

The transaction application 150 then uses the application front-end 120 to present the transaction-completion panel 740 to the user 112 (operation 1116). Note that the transaction-completion panel 740 can include any number and any type of transaction-completion fields, which facilitate the application front-end 120 receiving input from the user 112 and presenting output to the user 112 relating to the completion of the transaction. For example, in this embodiment the transaction-completion panel 740 includes a first name 741, a last name 742, an age 744, and a street address 746. Furthermore, note that operation 1116 can be a multi-step operation, which is described in more detail with reference to FIG. 14.

Next, the transaction application 150 receives transaction-completion information via the application front-end 120 from the user 112 who uses the transaction-completion fields to enter the transaction-completion information (operation 1118). The transaction application 150 then uses the application front-end 120 to update the detail information included in the transaction-options panel 530 based on the transaction-completion information as illustrated in FIG. 8 and FIG. 9 (operation 1120).

The transaction application 150 then completes the transaction (operation 1122). Note that operation 1122 can be a multi-step operation, which is described in more detail with reference to FIG. 16.

Initiating an Application

FIG. 12A presents a flowchart illustrating an embodiment of a process for initiating a transaction application 150. The process begins when the application server 140 completes operation 1102. The application server 140 initiates the application back-end 155 (operation 1202). Note that the application back-end 155 can perform server-side processing associated with the transaction application 150. For example, the application back-end 155 can retrieve data from the database 160, store data on the database 160, perform calculations related to the transaction, execute business logic related to the transaction, and perform any other operation that can facilitate completing the transaction.

Next, the application server 150 downloads the application front-end 120 to the client 110 (operation 1204). Note that the application front-end 120 can perform client-side processing associated with the transaction application 150. For example, the application front-end 120 can receive input from the user 112, present output to the user 112, change the format of output presented to the user 112, change the look and feel of the single web page 200, retrieve data from static data files related to transaction parameters, and perform any other operation that can facilitate completing the transaction.

The application server 150 can initiate the application front-end 120 at the client 110 (operation 1206). Note that operation 1206 can be a multi-step operation, which is described in more detail with reference to FIG. 12B. The transaction application 150 then proceeds to operation 1106.

FIG. 12B presents a flowchart illustrating an embodiment of a process for initiating an application front-end 120. The process begins when the application server 150 completes operation 1204. The transaction application 150 then uses the application front-end 120 to load the parameter-request panel 210 into the single web page 200 (operation 1252). Note that after operation 1252 completes, the parameter-request panel 210 is active.

In one embodiment, after operation 1252 completes, the parameter-request panel 210 is inactive. In this embodiment, the application front-end 120 can then make the parameter-request panel 210 active in response to a command from the transaction application 150, input from the user 112 at a web page associated with the parameter-request panel 210 or the transaction application 150, or any other type of trigger that can result in the application front-end 120 making the parameter-request panel 210 active.

Next, the transaction application 150 uses the application front-end 120 to load the transaction-options panel 230 into the single web page 200 (operation 1254). Note that after operation 1254 completes, the transaction-options panel 230 is inactive.

In one embodiment, after operation 1254 completes, the transaction-options panel 230 is active. In this embodiment, the application front-end 120 can then make the transaction-options panel 230 inactive in response to a command from the transaction application 150, input from the user 112 at a web page associated with the transaction-options panel 230 or the transaction application 150, or any other type of trigger that can result in the application front-end 120 making the transaction-options panel 230 inactive. Furthermore, the application front-end 120 may keep the transaction-options panel 230 active.

The application front-end 120 then loads parameter-request fields into the parameter-request panel 210 (operation 1256). Then, the application front-end 120 presents single the web page 200 to the user 112 (operation 1258). The transaction application 150 then proceeds to operation 1106.

Presenting a Transaction-Options Panel to a User

Figure 13:
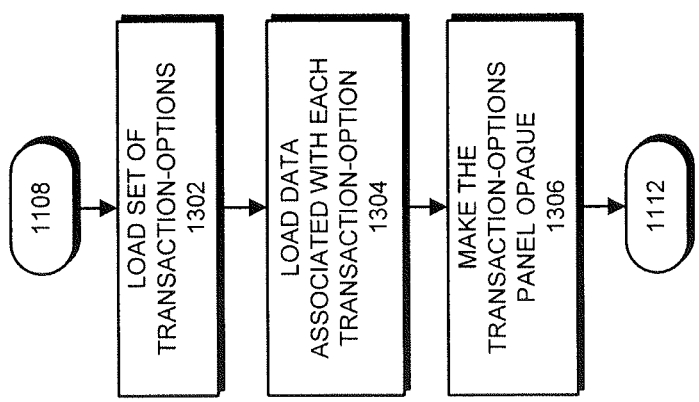
FIG. 13 presents a flowchart illustrating an embodiment of a process for presenting a transaction-options panel to a user.

FIG. 13 presents a flowchart illustrating an embodiment of a process for presenting a transaction-options panel 430 to a user 112. The process begins when the transaction application 150 completes operation 1108. The transaction application 150 then uses the application front-end 120 to load a set of transaction options associated with the transaction parameters into the transaction-options panel 430 (operation 1302). Then, the transaction application 150 uses the application front-end 120 to load data associated with each transaction option into the transaction-options panel 430 (operation 1304).

In one embodiment, the application front-end 120 obtains the set of transaction options and the data associated with each transaction option from data files the transaction application 150 downloads to the client 110 when initiating the application front-end 120. In this embodiment, the application front-end 120 can lookup the set of transaction options and the data associated with each transaction option from the data files based on the transaction parameters the application front-end 120 receives from the user 112. Note that the data files can be any type of file for easily storing and accessing data associated with the transaction parameters. For example, the data files can be eXtensible Markup Language (XML) files.

In one embodiment, the transaction application 150 can download the data files to the client 110 each time, each day, each week, or any other time period that the user 112 accesses a website associated with the transaction application 150.

In one embodiment, the transaction application 150 can download the data files to the client 110 each time an organization associated with the transaction application 150 updates the data files.

In one embodiment, the application front-end 120 obtains the set of transaction options and the data associated with each transaction option from the application back-end 155.

In this embodiment, the application back-end 155 determines the set of transaction options and the data associated with each transaction option based on the transaction parameters that the application front-end 120 receives from the user 112 and sends to the transaction application 150.

In one embodiment, the application back-end 155 obtains the set of transaction options and the data associated with each transaction option from the database 160 based on the transaction parameters.

The transaction application 150 then uses the application front-end 120 to make the transaction-options panel 430 active without modifying the parameter-request panel 410 (operation 1306). Note that the transaction-options panel 430 can include any number and any type of transaction-option display fields, which facilitate the application front-end 120 displaying the set of transaction options and the data associated with each transaction option to the user 112, and receiving a transaction-option selection from the user 112. For example, in this embodiment the transaction-options panel 430 includes: policy data 420, which displays the components associated with each transaction option; price-breakdown columns 432, which display the price associated with each product component to the user 112; total-price indicators 434, which display the total price for each product to the user 112; and product selectors 436, which enable the user 112 to select a transaction option associated with the product selectors 436. The transaction application 150 then proceeds to operation 1112.

Presenting a Transaction-Completion Panel to a User

Figure 14:
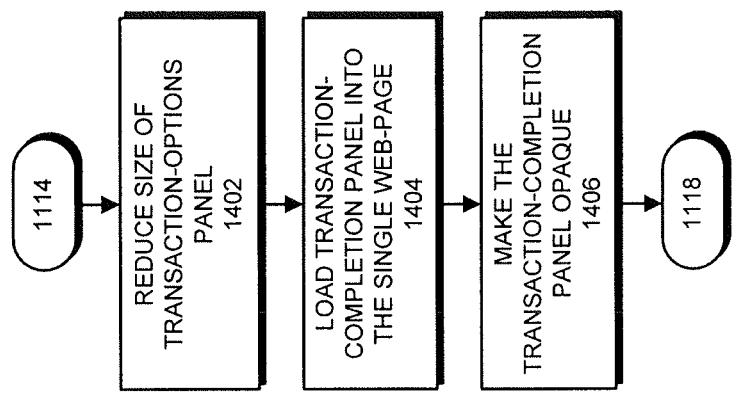
FIG. 14 presents a flowchart illustrating an embodiment of a process for presenting a transaction-completion panel to a user.

FIG. 14 presents a flowchart illustrating an embodiment of a process for presenting a transaction-completion panel 740 to a user 112. The process begins when the transaction application 150 completes operation 1114. The transaction application 150 then uses the application front-end 120 to reduce the size of the transaction-options panel from its original size, as illustrated by the transaction-options panel 430 of FIG. 4, to its reduced size, as illustrated by the transaction-options panel 530 of FIG. 5 (operation 1402). Note that, although the transaction-options panel 430 of FIG. 4 and the transaction-options panel 530 of FIG. 5 may display different information, the transaction-options panels 430, 530 can be the same panel.

In one embodiment, the transaction application 150 uses the application front-end 120 to replace the larger transaction-options panel with a different smaller panel. In this embodiment, the transaction-options panel 430 of FIG. 4 and the transaction-options panel 530 of FIG. 5 can be different panels. Note that, even if the transaction-options panels 430, 530 display the same information, the transaction-options panels 430, 530 can be different panels.

Next, the transaction application 150 uses the application front-end 120 to load the transaction-completion panel 540 into the single web page 200 (operation 1404). Note that, at the completion of operation 1404, the transaction-completion panel 540 is inactive. The transaction application 150 then makes the transaction-completion panel 540 active, as illustrated by the transaction-completion panel 740 of FIG. 7 without modifying the parameter-request panel 410 (operation 1406). The transaction application 150 then proceeds to operation 1118.

In one embodiment, the transaction application 150 can make the transaction-completion panel 540 active in response to the user 112 accepting a set of declarations. This can involve the user 112 selecting the declaration button 538. The transaction application 150 can then present the user 112 with the declarations dialog box 610, which includes the set of declarations 612 that the user 112 is required to select to proceed with the transaction. Upon the user 112 selecting the set of declarations 612 and pressing the ok button 614, the transaction application 150 can make the transaction-completion panel 540 active.

In one embodiment, accepting a set of declarations is optional.

In one embodiment, when the application front-end 120 loads the transaction-completion panel 540, the transaction-completion panel 540 is active as illustrated by the transaction-completion panel 740 of FIG. 7. In this embodiment, operation 1406 can be omitted and the transaction application 150 proceeds to operation 1118 after operation 1404 completes.

Reviewing a Set of Transaction Options

Figure 15:
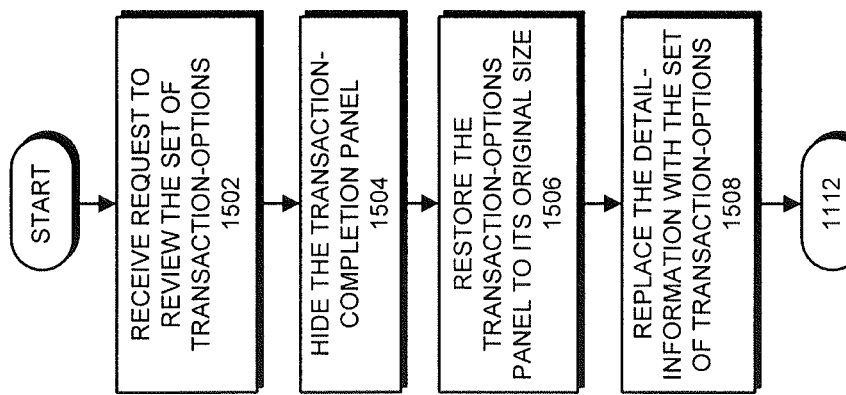
FIG. 15 presents a flowchart illustrating an embodiment of a process for reviewing a set of transaction options.

FIG. 15 presents a flowchart illustrating an embodiment of a process for reviewing a set of transaction options. Note that this process can occur at any time after operation 1112 completes but before operation 1122 completes. The process can begin when the transaction application 150 receives a request to review the set of transaction operations that the transaction application 150 presented to the user 112 in the transaction-options panel 430 (operation 1502). Note that the user 112 can send this request to the transaction application 150 by pressing the back to cover options button 570. In response to receiving the request to review the set of transaction options, the transaction application 150 uses the application front-end 120 to hide the transaction-completion panel 540 (operation 1504). The transaction application 150 then uses the application front-end 120 to restore the transaction-options panel 530 to its original size, as illustrated by the transaction-options panel 430 of FIG. 4 (operation 1506). Note that, although the transaction-options panel 530 of FIG. 5 and the transaction-options panel 430 of FIG. 4 may present different information, the transaction-options panels 530, 430 can be the same panel.

In one embodiment, the application front-end 120 replaces the transaction-options panel 530 of FIG. 5 with the transaction-options panel 430 of FIG. 4. In this embodiment, the transaction-options panel 530 of FIG. 5 and the transaction-options panel 430 of FIG. 4 can be different panels.

The application front-end 120 then replaces the detail information associated with the transaction-option selection, as illustrated in the transaction-options panel 530 of FIG. 5, with the set of transaction options, as illustrated in the transaction-options panel 430 of FIG. 4 (operation 1508). The transaction application 150 then proceeds to operation 1112.

In one embodiment, if the user 112 modified the transaction parameters via the parameter-request panel 410, then the application front-end 120 replaces the detail information associated with the transaction-option selection with a new set of transaction options associated with the modified transaction parameters.

Completing a Transaction

Figure 16:
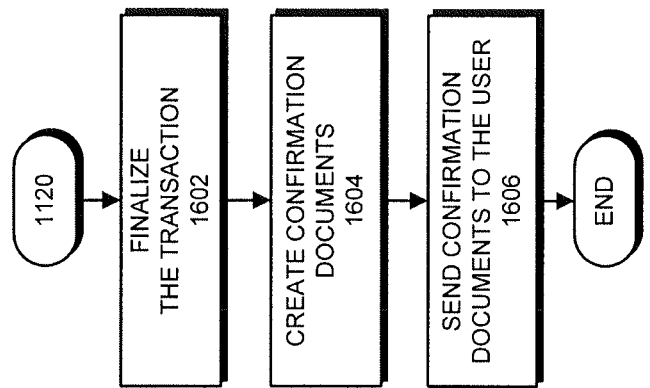
FIG. 16 presents a flowchart illustrating an embodiment of a process for completing a transaction.

FIG. 16 presents a flowchart illustrating an embodiment of a process for completing a transaction. The process begins when the transaction application 150 completes operation 1120. The transaction application 150 then finalizes the transaction (operation 1602). Note that this can involve: obtaining payment information, such as via a payment sub-panel 990; obtaining shipping information; receiving a shipping method selection, such as via a policy receipt panel 995; confirming user details, such as user-identification and age; receiving a gift-wrap selection; receiving a gift message; and any other process that the transaction application 150 can perform in finalizing the transaction.

Next, the transaction application 150 creates confirmation documents (operation 1604). The transaction application 150 then sends the confirmation documents to the user 112 (operation 1606). Note that the transaction application 150 can send the confirmation documents to the user 112 via a predetermined communication method, or via a user-selected communication method. Furthermore, note that the transaction application 150 can send the confirmation documents: to the user 112 as proof of the transaction; to an organization associated with the transaction application 150 as a record of the transaction; to a third party as evidence of the transaction, to a third party who will provide a necessary product or service required to complete the transaction, or to any other party associated with the transaction.

In one embodiment, the transaction application 150 can provide the confirmation documents to the user 112 via the confirmation panel 1010, which includes links 1020 to the confirmation documents.

In one embodiment, the application server 140 stores the confirmation documents. In one embodiment, the database 160 stores the confirmation documents. In this embodiment, in response to the user 112 accessing the links 1020, the transaction application 150 retrieves the confirmation documents from the database 160 and provides the confirmation documents to the user 112.

Modifying a Set of Transaction Options

Figure 17:
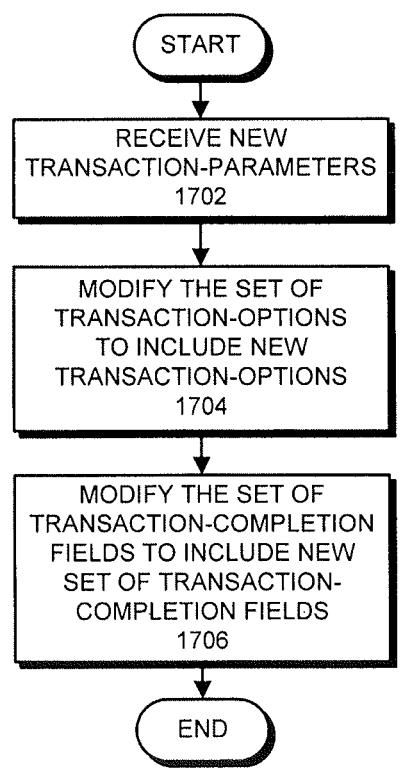
FIG. 17 presents a flowchart illustrating an embodiment of a process for modifying a set of transaction options.

FIG. 17 presents a flowchart illustrating an embodiment of a process for modifying a set of transaction options. Note that this process can occur at any time after operation 1108 completes but before operation 1122 completes. The process begins when the transaction application 150 receives new transaction parameters from the user 112 via the parameter-request panel 810 (operation 1702). Note that, in the example illustrated in FIG. 8, the parameter-request panel 810 of FIG. 8 is equivalent to the parameter-request panel 410 of FIG. 4, except the user 112 has modified the adult tally 412 as reflected by the adult tally 812.

The transaction application 150 then modifies the set of transaction options to include a new set of transaction options associated with the new transaction parameters (operation 1704). Note that the transaction application 150 can also modify the detail information associated with each new transaction option.

In one embodiment, operation 1702 may result in no changes to the set of transaction operations. In this embodiment, the transaction application 150 may not perform operation 1704.

In one embodiment, if the transaction application 150 has hidden the set of transaction options in response to receiving a transaction option selection from the user 112, the transaction application 150 presents the new transaction options to the user 112 upon the user 112 reviewing the set of transaction options as described with reference to FIG. 15.

For example, by reducing the number of adult travelers, as reflected by the adult tally 812, the transaction application 150 updates the total-price indicator 834 to reflect a new price for the transaction-option selection. If the user 112 reviews the set of transaction options using the process described with reference to FIG. 15, the transaction application 150 can update each of the total-price indicator 434s illustrated in FIG. 4 to reflect new prices for each transaction option associated with the set of transaction options.

Next, the transaction application 150 modifies the set of transaction-completion fields to include a new set of transaction-completion fields associated with the new set of transaction options (operation 1706). For example, in response to the user 112 reducing the adult tally 412 by one, as reflected in the adult tally 812 shown in FIG. 8, the transaction application 150 reduces the number of traveler-detail panels from three, as illustrated by the traveler-detail panel 772 of FIG. 7, to two, as illustrated by the traveler-detail panel 872 of FIG. 8.

In one embodiment, operation 1702 may result in no changes to the set of transaction-completion fields. In this embodiment, the transaction application 150 may not perform operation 1706.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus that performs a transaction, comprising:
   (a) a presentation mechanism configured to present in a single web page a parameter-request panel to a user at a client via a network, wherein the parameter-request panel includes a set of parameter-request fields;
   (b) a receiving mechanism configured to receive through the network transaction parameters from the user at the client;
   (c) the presentation mechanism further configured to present in the single web page a transaction-options panel to the user without obscuring the parameter-request panel, wherein the transaction-options panel includes a set of transaction options associated with the transaction parameters;
   (d) the receiving mechanism further configured to receive from the user at the client through the network a transaction-option selection associated with the set of transaction options;
   (e) the presentation mechanism further configured, in response to the receiving mechanism receiving the transaction-option selection, to present in the single web page a transaction-completion panel to the user without obscuring the parameter-request panel and the transaction-options panel, wherein the transaction-completion panel includes a set of transaction-completion fields associated with the transaction-option selection;
   (f) the receiving mechanism further configured to receive through the network from the user at the client transaction-completion information.

2. The apparatus of claim 1, wherein the receiving mechanism is configured to receive an initiate-application command from the user via the application server, and further comprising: an initiation mechanism configured to initiate the transaction application associated with the initiate-application command, wherein the initiation mechanism is further configured to:
   (a) initiate an application back-end at the application server, wherein the application back-end performs server-side processing associated with the application;
   (b) download to the client an application front-end, wherein the application front-end performs client-side processing associated with the application; and
   (c) initiate the application front-end at the client.

3. The apparatus of claim 2, wherein the initiation mechanism further comprises:
   (a) a loading mechanism configured to load the parameter-request panel into a single web page, wherein the parameter-request panel is active;
   (b) the loading mechanism further configured to load the transaction-options panel into the single web page, wherein the transaction-options panel is inactive;
   (c) the loading mechanism further configured to load the set of parameter- request fields into the parameter-request panel; and
   (d) a presentation mechanism configured to present the single web page to the user at the client.

4. The apparatus of claim 1, wherein the presentation mechanism further comprises:
   (a) a loading mechanism configured to load the set of transaction options into the transaction-options panel;
   (b) the loading mechanism further configured to load data associated with each transaction option from the set of transaction options into the transaction-options panel; and
   (c) a modification mechanism configured to make the transaction-options panel active without modifying the parameter-request panel.

5. The apparatus of claim 1, further comprising a replacement mechanism configured to replace the set of transaction options included in the transaction- options panel with detail information associated with the transaction-option selection.

6. The apparatus of claim 5, further comprising:
   (a) the receiving mechanism further configured to receive a request to review the set of transaction options;
   (b) a hiding mechanism configured to hide the transaction-completion panel;
   (c) a restoring mechanism configured to restore the transaction-options panel to its original size, and (d) the replacement mechanism further configured to replace the detail information associated with the transaction-option selection with the set of transaction options.

7. The apparatus of claim 5, further comprising an updating mechanism configured to update the detail information to include information associated with the transaction-completion information.

8. The apparatus of claim 1, wherein the presentation mechanism is further configured to:
   (a) reduce the size of the transaction-options panel from its original size to a reduced size;
   (b) load the transaction-completion panel into the single web page; and
   (c) make the transaction-completion panel active without modifying the parameter-request panel and without making additional modifications to the transaction-options panel.

9. The apparatus of claim 1, further comprising a completion mechanism configured to complete the transaction, wherein the completion mechanism is further configured to:
   (a) finalize the transaction;
   (b) create confirmation documents; and
   (c) send the confirmation documents to the user.

10. The apparatus of claim 1, further comprising:
   (a) the receiving mechanism further configured to receive new transaction parameters from the user;
   (b) a modification mechanism configured to modify the set of transaction options to include a new set of transaction options associated with the new transaction parameters, and
   (c) the modification mechanism further configured to modify the set of transaction-completion fields to include a new set of transaction-completion fields associated with the new set of transaction options.

* * * * *